(12) United States Patent
Mason et al.

(10) Patent No.: US 12,351,386 B2
(45) Date of Patent: Jul. 8, 2025

(54) APPARATUS AND METHOD FOR RECEIVING AND CONVEYING BULK MATERIAL

(71) Applicant: SPIROFLOW LIMITED, Lancashire (GB)

(72) Inventors: Terry Mason, Lancashire (GB); Christopher Brennan, Lancashire (GB)

(73) Assignee: SPIROFLOW LIMITED, Lancashire (GB)

( * ) Notice: Subject to any disclaimer, the term of this patent is extended or adjusted under 35 U.S.C. 154(b) by 139 days.

(21) Appl. No.: 18/153,971

(22) Filed: Jan. 12, 2023

(65) Prior Publication Data

US 2023/0227249 A1 Jul. 20, 2023

(30) Foreign Application Priority Data

Jan. 14, 2022 (GB) ..................................... 2200474

(51) Int. Cl.
*B65D 88/66* (2006.01)
*B65G 3/04* (2006.01)

(52) U.S. Cl.
CPC .............. *B65D 88/66* (2013.01); *B65G 3/04* (2013.01)

(58) Field of Classification Search
CPC ........ B65D 88/68; B65D 88/66; B65G 65/46; B65G 3/04; B65G 53/42; B65G 53/14; B65G 65/4881
See application file for complete search history.

(56) References Cited

U.S. PATENT DOCUMENTS

| | | | |
|---|---|---|---|
| 3,995,836 A | 12/1976 | Carter et al. | |
| 4,344,580 A * | 8/1982 | Hoshall | B65G 65/46 366/322 |
| 2010/0186736 A1* | 7/2010 | Burke | B65G 65/46 127/1 |

FOREIGN PATENT DOCUMENTS

| | | | |
|---|---|---|---|
| CN | 106044274 | | 10/2016 |
| CN | 205634251 | | 10/2016 |
| CN | 110857188 A | * | 3/2020 |
| WO | WO2015010247 | | 1/2015 |

* cited by examiner

*Primary Examiner* — Donnell A Long
(74) *Attorney, Agent, or Firm* — McDonnell Boehnen & Berghoff LLP

(57) ABSTRACT

An apparatus for receiving and conveying bulk material is provided. The apparatus comprises a hopper for receiving bulk material, at least one outlet configured to enable bulk material, received by the hopper, to exit the hopper, and an agitator arrangement. The agitator arrangement is configured to agitate the bulk material in the hopper in order to counteract cohesion of the bulk material, and configured to urge the bulk material in the hopper towards the at least one outlet.

23 Claims, 16 Drawing Sheets

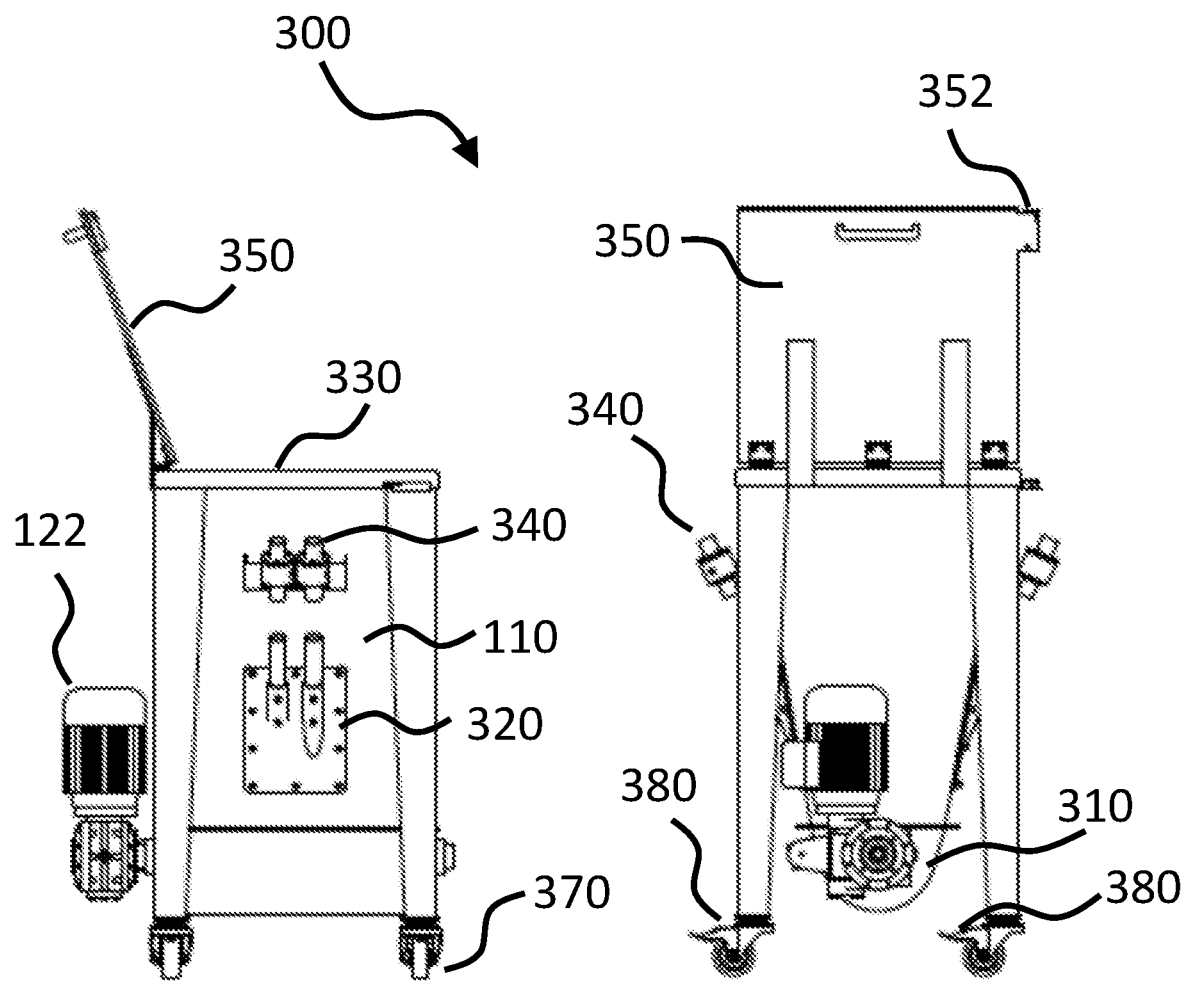
FIG. 4A
FIG. 4B
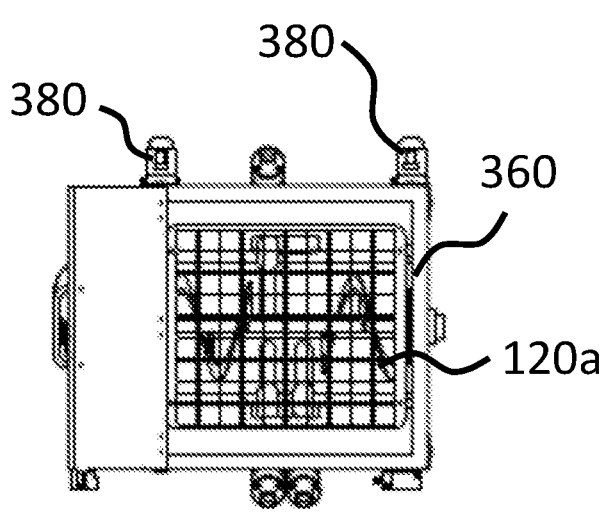
FIG. 4C

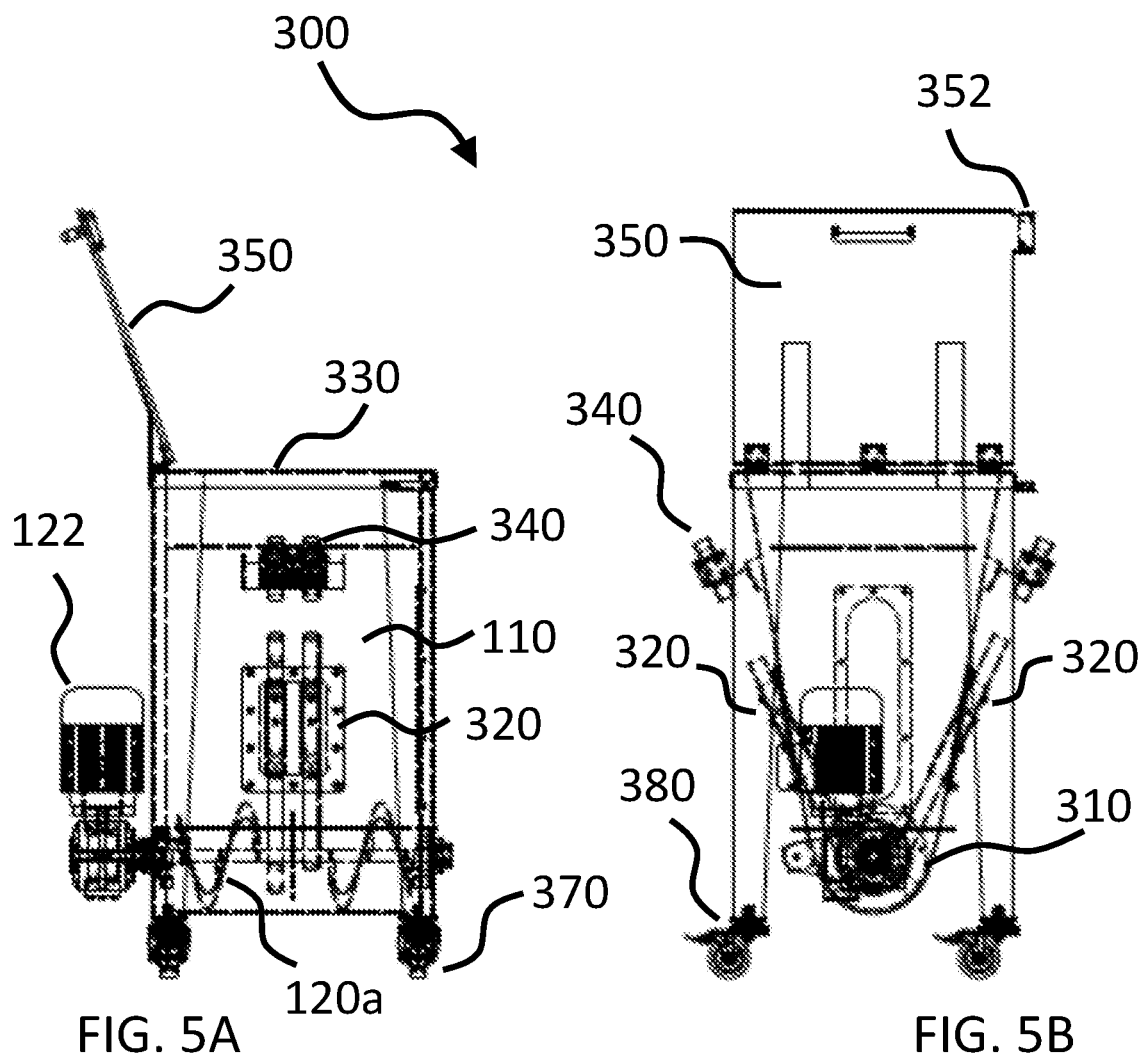
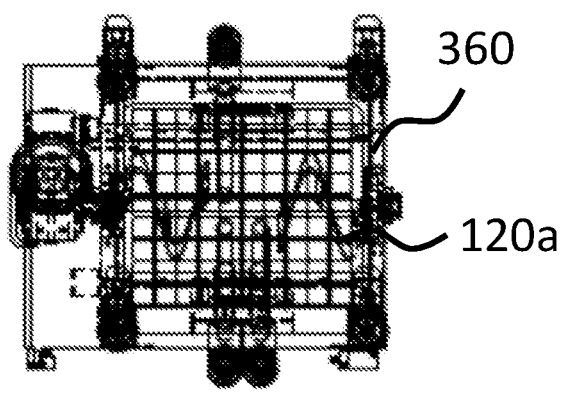
FIG. 5A  FIG. 5B
FIG. 5C

APPARATUS AND METHOD FOR RECEIVING AND CONVEYING BULK MATERIAL

FIELD OF THE INVENTION

Embodiments of the present disclosure relate to an apparatus and method for receiving and conveying bulk material. Some relate to an apparatus and method for improving the efficiency of receiving and conveying bulk material.

BACKGROUND OF THE INVENTION

Bulk materials are often transferred from packaging to a production line through use of a conveying apparatus. The bulk material pass through a conduit to a desired location in the production line.

Occasionally, the ambient temperature and the humidity of the environment affects the bulk material. The conduit of the conveying apparatus can become blocked thus causing significant downtime in a production line.

SUMMARY OF THE INVENTION

According to various, but not necessarily all, embodiments there is provided an apparatus for receiving and conveying bulk material. The apparatus comprises a hopper for receiving bulk material, at least one outlet configured to enable bulk material, received by the hopper, to exit the hopper, and an agitator arrangement. The agitator arrangement is configured to agitate the bulk material in the hopper in order to counteract cohesion of the bulk material, and configured to urge the bulk material in the hopper towards the at least one outlet.

The agitator arrangement may comprise at least one agitation surface for agitating the bulk material in order to counteract cohesion of the bulk material, and for urging the bulk material towards the at least one outlet.

The agitation surface may be at least partially helical in shape.

The agitator arrangement may comprise a ribbon screw, and the at least one agitation surface may be at least partially provided by the ribbon screw.

The at least one agitation surface may be configured to rotate about a rotational axis.

The agitator arrangement may comprise a shaft aligned with the rotational axis and at least a portion of the at least one agitation surface may extend around the shaft.

The at least one outlet may be located below the rotational axis of the shaft.

At least a portion of the at least one agitation surface may extend helically around the shaft.

The at least one agitation surface may be fixed in position relative to the shaft.

At least a portion of the shaft, and the at least one agitation surface, may be housed within the hopper, and wherein in at least one rotational position of the shaft, a clearance between a portion of the agitation surface and at least one inner surface of the hopper may be less than the smallest dimension of the received bulk material.

The agitator arrangement may comprise a first agitator configured to urge the bulk material in at least a first direction, and a second agitator configured to urge the bulk material in at least a second direction.

The first agitator may be configured to urge the bulk material in at least the first direction towards the at least one outlet. The second agitator may be configured to urge the bulk material in at least the second direction towards the at least one outlet.

The second direction may be opposite to the first direction.

The first direction and second direction may be aligned with a first dimension. The agitator arrangement may comprise a third agitator, configured to agitate the bulk material in the hopper. The third agitator may be positioned between the first agitator and the second agitator in the first dimension.

The third agitator may be located proximal to the at least one outlet.

The at least one agitation surface may comprise a first agitation surface provided by the first agitator and a second agitation surface provided by the second agitator. The rotational axis may be parallel or co-incident with the first dimension.

The third agitator may extend away from the shaft in a direction that is orthogonal to the rotational axis.

The agitator arrangement may comprise a fourth agitator, configured to agitate the bulk material in the hopper. The fourth agitator may be positioned between the first agitator and the third agitator in the first dimension.

The fourth agitator may be located proximal to the at least one outlet.

The fourth agitator may extend away from the shaft in a direction that is orthogonal to the rotational axis.

The agitator arrangement may comprise a fifth agitator, configured to agitate the bulk material in the hopper. The fifth agitator may be positioned between the second agitator and the third agitator in the first dimension.

The fifth agitator may be located proximal to the at least one outlet.

The fifth agitator may extend away from the shaft in a direction that is orthogonal to the rotational axis.

The outlet may be connected to a conduit for conveying the bulk material away from the hopper.

The hopper may comprise an opening for receiving bulk material. The apparatus may comprise a filter covering the opening. The filter may be configured to filter out items having dimensions exceeding predefined minimum dimensions from entering the hopper through the opening.

The filter may comprise a filtration grid comprising a plurality of cells. The filtration grid may be configured to filter out an item having dimensions exceeding the dimensions of an individual cell from entering the hopper through the opening.

The at least one outlet may comprise a plurality of outlets. The agitator arrangement may be configured to urge the bulk material in the hopper towards the plurality of outlets.

The apparatus may comprise control circuitry configured to assign a priority label to each of the plurality of outlets. The control circuitry may be configured to control the conveyance of bulk material through the plurality of outlets based on the priority label.

According to various, but not necessarily all, embodiments there is provided a method for receiving and conveying bulk material. The method comprises receiving bulk material in a hopper, agitating the bulk material in the hopper in order to counteract cohesion of the bulk material, and urging the bulk material in the hopper towards at least one outlet.

The method may comprise urging bulk material in a first direction towards the at least one outlet and urging bulk material in a second direction towards the at least one outlet. The second direction may be opposite to the first direction.

According to various, but not necessarily all, embodiments there is provided an apparatus for receiving and conveying bulk material. The apparatus comprises a hopper for receiving bulk material, and at least one outlet configured to enable bulk material, received by the hopper, to exit the hopper. The apparatus comprises a shaft, a motor configured to rotate the shaft, and a first ribbon screw attached to the shaft and configured to extend helically around the shaft. The first ribbon screw is configured to agitate and urge the bulk material in the hopper in a first direction towards the at least one outlet. The apparatus comprises a second ribbon screw attached to the shaft and configured to extend helically around the shaft. The second ribbon screw is configured to agitate and urge the bulk material in the hopper in a second direction towards the at least one outlet.

BRIEF DESCRIPTION OF THE DRAWINGS

Some examples will now be described with reference to the accompanying drawings in which:

FIG. 4A is a side view of a further example of the apparatus;

FIG. 4B is a rear view of the further example of the apparatus;

FIG. 4C is a plan view of the further example of the apparatus;

FIG. 5A is a see-through side view of the further example of the apparatus;

FIG. 5B is a see-through rear view of the further example of the apparatus;

FIG. 5C is a see-through plan view of the further example of the apparatus;

FIG. 7 is a flowchart of a first method;

FIG. 8A shows example pellets;

FIG. 8B shows a close-up of an example pellet;

FIG. 9 is a flowchart of a second method; and

DETAILED DESCRIPTION OF EMBODIMENTS OF THE INVENTION

Embodiments of the invention relate to apparatus for receiving and conveying bulk material within an environment, such as within a factory setting, and associated methods.

The bulk material might, for example, be or comprise powder, granules, capsules or tablets. The bulk material might be or comprise pellets. The bulk material may have a cohesive nature. For example, exposure to ambient conditions may cause the bulk material to stick together. In embodiments of the invention, the bulk material comprises pellets which are received in a hopper, agitated within the hopper in order to counteract the cohesion of the pellets and enable them to be conveyed effectively.

Figure 1:
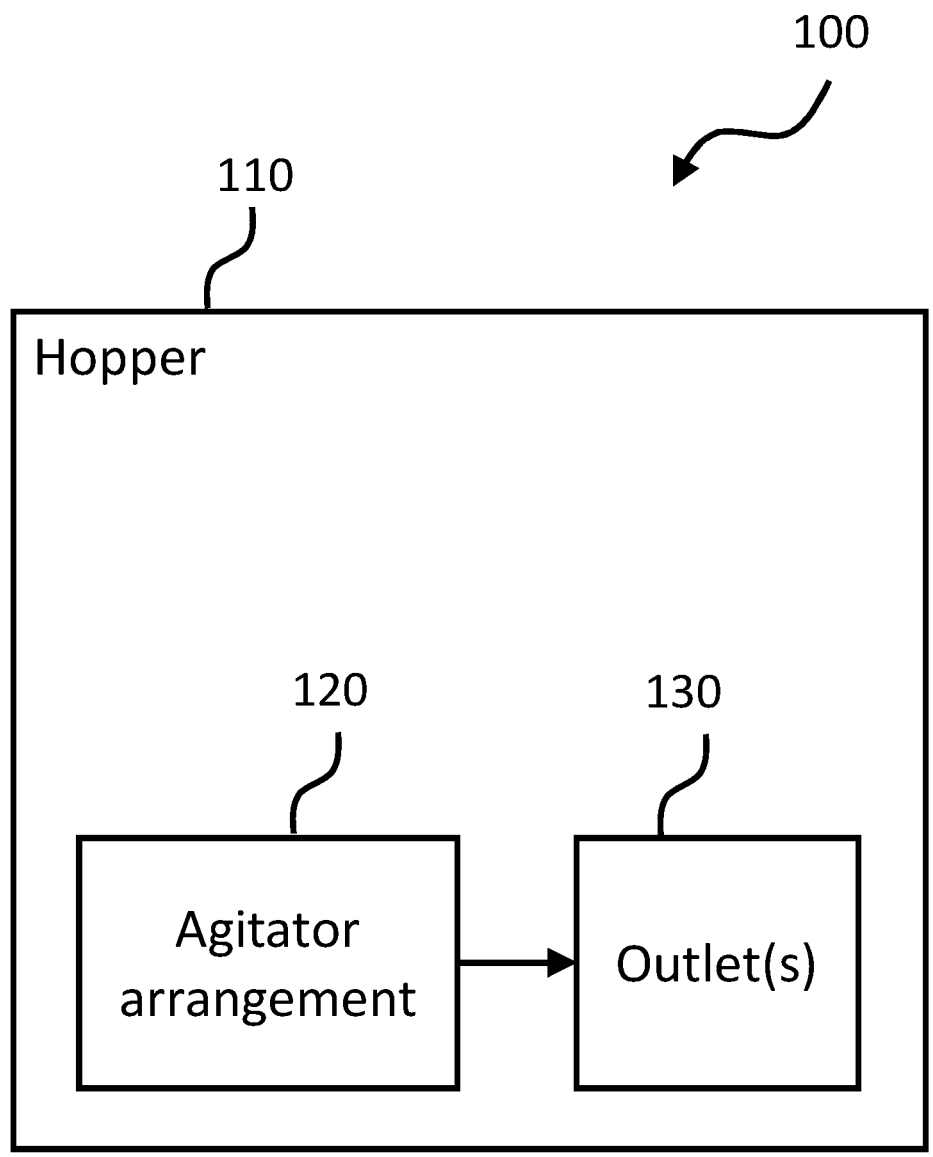
FIG. 1 is a schematic diagram of an example of an apparatus.

FIG. 1 shows a schematic diagram of an example apparatus 100. The illustrated apparatus 100 comprises a hopper 110, an agitator arrangement 120 and at least one outlet 130.

The hopper 110 is for receiving bulk material, which may be in the form of pellets. The hopper 110 defines a volume in which the pellets may be received, stored (at least temporarily) and agitated.

The outlet(s) 130 and at least part of the agitator arrangement 120 may be housed by the hopper 110. The agitator arrangement 120 is configured to agitate the pellets in the hopper 110 in order to counteract cohesion of the pellets. The agitator arrangement 120 is also configured to urge the pellets in the hopper 110 towards the outlet(s) 130. The agitator arrangement 120 may comprise at least one agitation surface that is, for example, at least partially helical in shape which is for agitating the pellets in order to counteract cohesion of the pellets, and for urging the pellets towards the outlet(s) 130.

Figure 2:
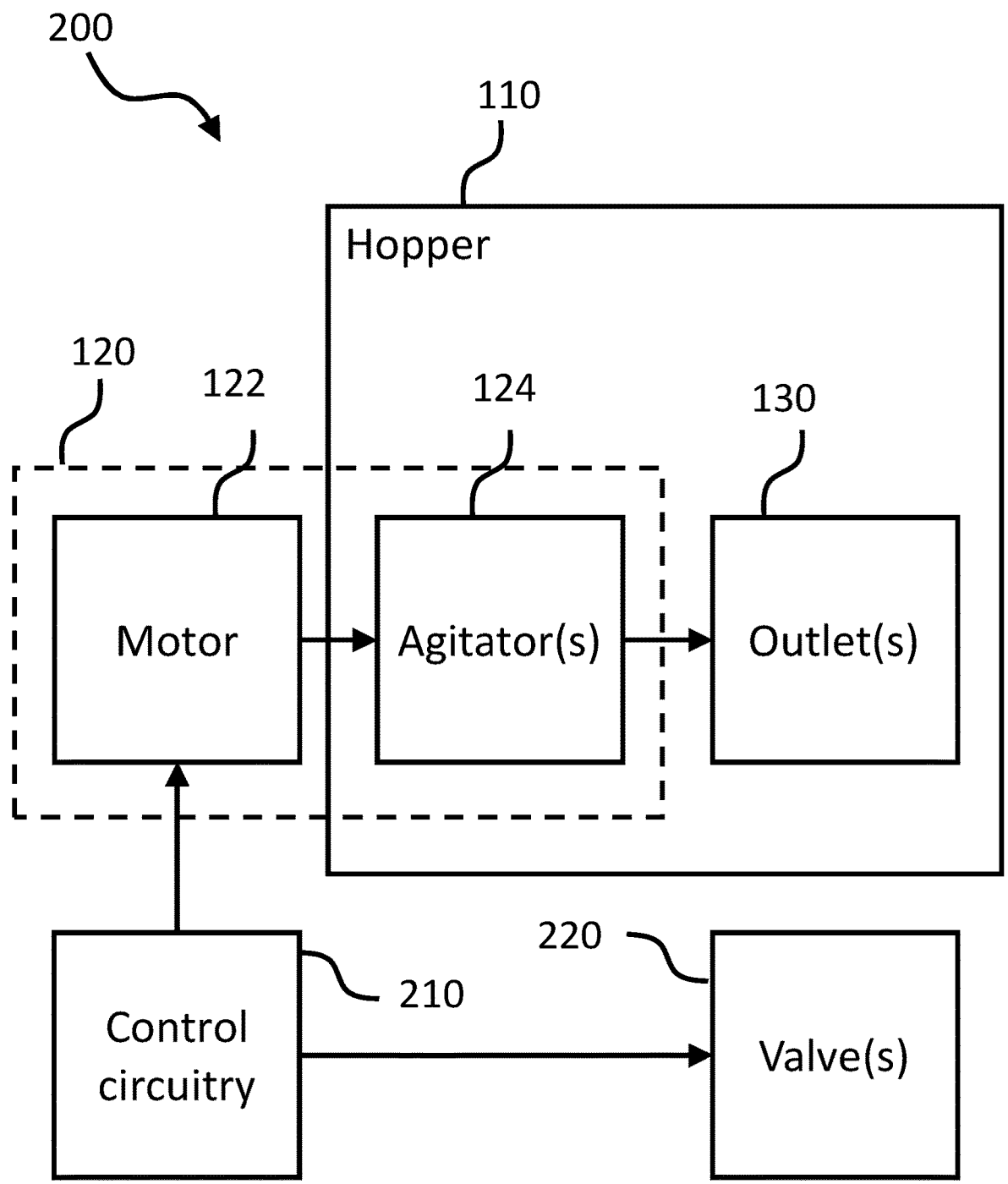
FIG. 2 is a schematic diagram of another example of the apparatus.

FIG. 2 shows a schematic diagram of another example of the apparatus 200. The apparatus illustrated in FIG. 2 comprises the features of the apparatus 100 in FIG. 1. In addition, the apparatus 200 comprises a control circuitry 210 and one or more valves 220. In FIG. 2, the agitator arrangement 120 is illustrated as comprising at least one motor 122 and one or more agitators 124.

The control circuitry 210 may be implemented in hardware alone, have certain aspects in software including firmware alone or can be a combination of hardware and software (including firmware).

The control circuitry 210 is configured to control the motor 122 of the agitator arrangement 120. The motor 122 is configured to cause the agitator(s) 124 to agitate the pellets in the hopper 110. It may be that the motor 122 is configured to cause the agitator(s) 124 to also urge the pellets towards the outlet(s) 130. The control circuitry 210 might be configured to control the speed at which the motor 122 causes the agitator(s) 124 to agitate the pellets.

The control circuitry 210 is further configured to control one or more valves 220. The one or more valves 220 might include one or more solenoid valves. The valve(s) 220 is/are connected to the outlet(s) 130 and may allow or restrict the extraction/conveyance of pellets from the hopper 110 via the outlet(s) 130. In some examples where there are multiple outlets 130, it may be that each outlet has an associated respective valve 130. The control circuitry 210 may control each of the valves 220 independently.

Figure 3:
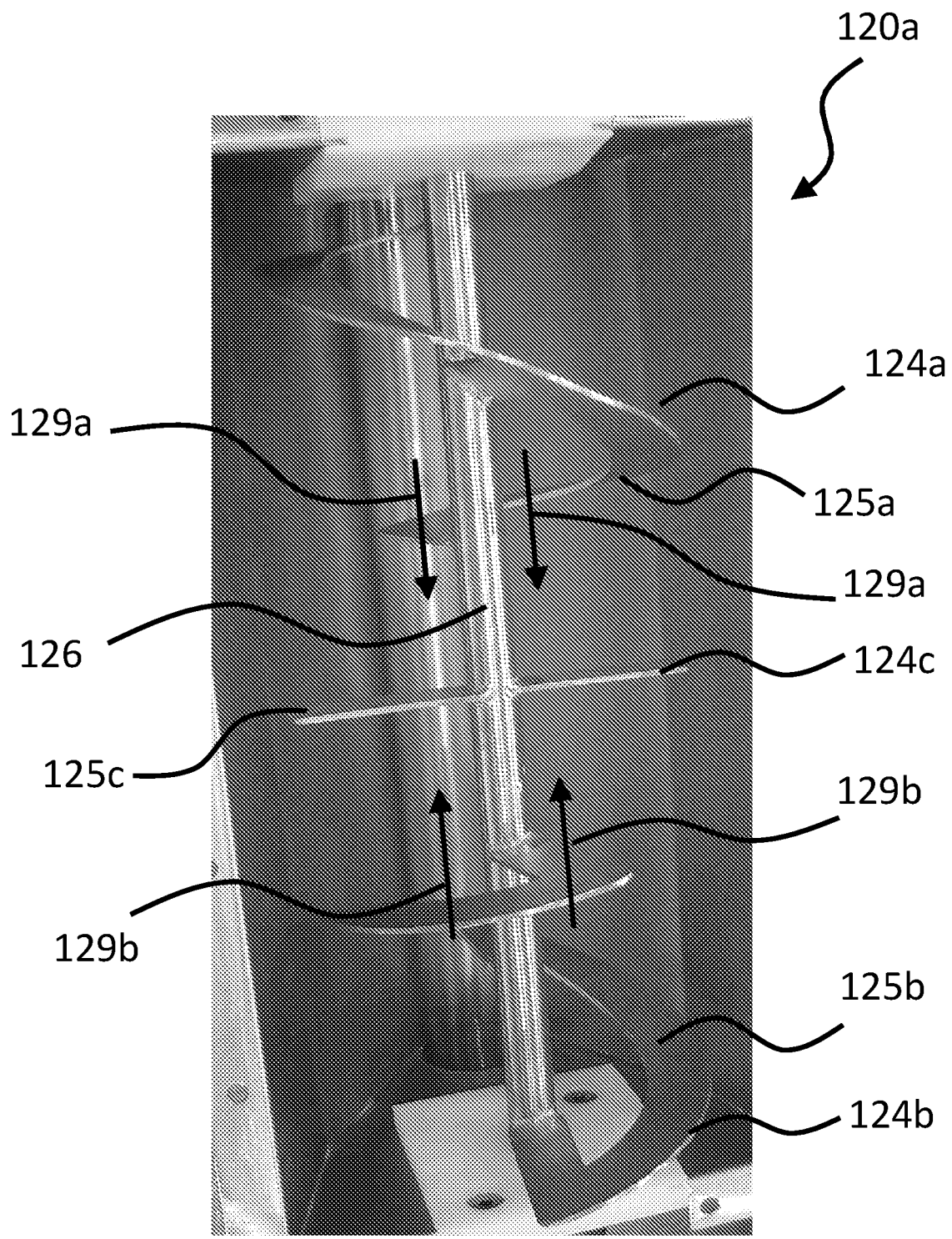
FIG. 3 shows a first example of at least a part of an agitator arrangement.
Figures 4D, 4E:
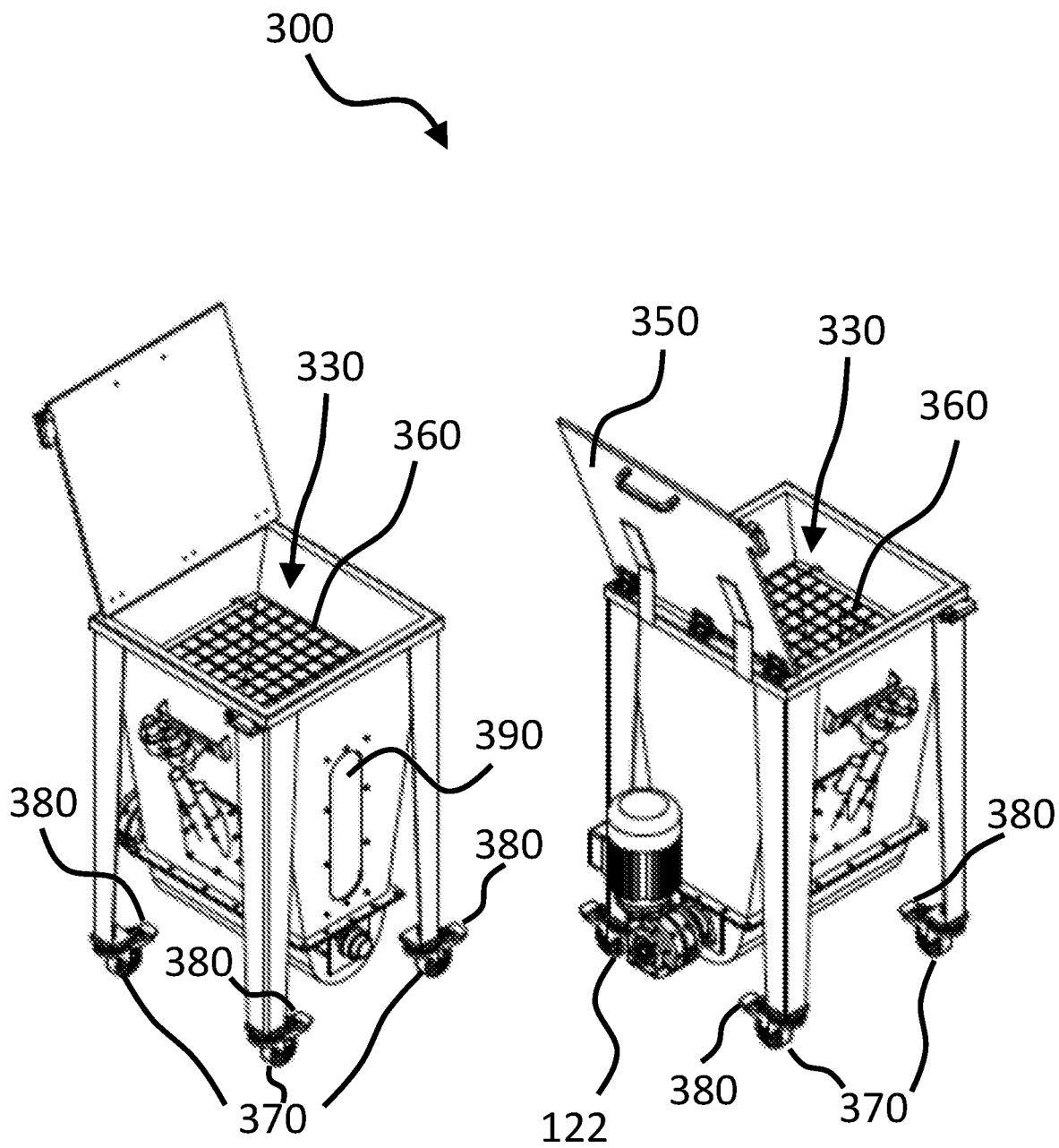
FIG. 4D is a first perspective view of the further example of the apparatus.
FIG. 4E is a second perspective view of the further example of the apparatus.

FIG. 3 illustrates an example of at least part of an agitator arrangement 120a. The agitator arrangement 120a comprises at least one agitation surface 125a, 125b for agitating the pellets in order to counteract cohesion of pellets in the hopper 110, and for urging the pellets towards the outlets 130a-d.

In the example illustrated in FIG. 3 (and also in FIG. 6), the agitator arrangement 120a comprises a first agitator 124a that provides a first agitation surface 125a. The first agitation surface 125a is helical in shape in the illustrated example. In this regard, the first agitator 124a may be a ribbon screw and the first agitation surface 125a may be at least partially provided by the ribbon screw. In this example, the first agitation surface 125a is substantially flat, but might have a different shape in other examples.

The first agitation surface 125a (and the first agitator 124a) may be configured to rotate about a rotational axis. The rotational axis may be aligned with a shaft 126. That is, the shaft 126 may have a longitudinal extent and the rotational axis may be aligned with the longitudinal extent of the shaft 126 and pass through the shaft 126.

At least a portion of the first agitation surface 125a may extend around the shaft 126. The (radial) distance of the first agitation surface 125a from the shaft 126 may differ along the longitudinal extent of the shaft 126, as the shaft 126 extends around the shaft 126. The first agitation surface 125a may, for instance, extend helically around the shaft 126 as shown in FIG. 3.

The first agitation surface 125a may be fixed in position relative to the shaft 126. That is, in the illustrated example, the first agitator/ribbon screw 125a is fixed to the shaft 126 and, in some instances, may be welded to the shaft 126.

The shaft 126 may, for instance, be coupled to the motor 122, which causes the shaft 126 (and therefore the first agitator 124a and the first agitation surface 125a) to rotate about the rotational axis.

In the example illustrated in FIG. 3, the agitator arrangement 120a comprises a second agitator 124b in addition to the first agitator 124a. However, in other examples, only a single agitator 124 may be provided, or a greater number of agitators 124.

The second agitator 124b provides a second agitation surface 125b. The second agitation surface 125b is helical in shape in the illustrated example. In this regard, the second agitator 124b may be a ribbon screw and the second agitation surface 125b may be at least partially provided by the ribbon screw. In this example, the second agitation surface 125b is substantially flat, but might have a different shape in other examples.

The second agitation surface 125b (and the second agitator 124b) may be configured to rotate about the rotational axis that is aligned with the shaft 126. At least a portion of the second agitation surface 125b may extend around the shaft 126. The (radial) distance of the second agitation surface 125b from the shaft 126 may differ along the longitudinal extent of the shaft 126, as the shaft 126 extends around the shaft 126. The second agitation surface 125b may, for instance, extend helically around the shaft 126 as shown in FIG. 3.

The second agitation surface 125b may be fixed in position relative to the shaft 126. That is, in the illustrated example, the second agitator/ribbon screw 125b is fixed to the shaft 126 and, in some instances, may be welded to the shaft 126.

The first agitator 125a is spaced from the second agitator 126b. In this example, the first agitator 125a is spaced from the second agitator 126b in a dimension that is defined by the rotational axis.

The agitators 124a, 124b and their agitation surfaces 125a, 125b are configured to agitate pellets in the hopper 110, in order to counteract cohesion of the pellets in the hopper 110.

The agitators 124a, 124b and their agitation surfaces 125a, 125b are also configured to urge the pellets in the hopper 110 towards at least one outlet 130. In the illustrated example, the first agitator 124a and its agitation surface 125a are configured to urge the pellets in at least a first direction 129a, as shown in FIG. 3. The second agitator 124b and its agitation surface 125b are configured to urge the pellets in at least a second direction 129b. The second direction 129b is opposite to the first direction in FIG. 3. The first and second directions 129a, 129b are aligned with a dimension. The longitudinal extent and the rotational axis of the shaft 126 are parallel to or co-incident with the dimension.

In effect, each of the first and second agitators 124a, 124b acts as a screw conveyor within the hopper 110, where the first agitator 124a and its agitation surface 125a is both agitating pellets in the hopper 110 and conveying them in the first direction 129a towards the outlet(s) 130, and the second agitator 124b and its agitation surface 125b is both agitating pellets and conveying them in the second direction 129b towards the outlet(s).

The first agitator 124a is configured to have a particular flighting, which in the illustrated example is a left-handed flighting. Conversely, the second agitator 124b is configured to have an opposite flighting, for example a right-handed flighting.

The agitator arrangement 120a may comprise a third agitator 124c. The third agitator 124c is different in shape from the first and second agitators 124a, 124b. The third agitator 124c is also configured to agitate pellets in the hopper 110. It is positioned between the first agitator 124a and second agitator 124b in the dimension that is parallel to or co-incident with the longitudinal extent of the shaft 126 and the axis of rotation. The third agitator 124c extends away from the shaft in at least one direction that is orthogonal to the rotational axis and the longitudinal extent of the shaft 126. In the illustrated example, the third agitator 124c comprises two portions: a first portion that extends away from the shaft in one direction, and a second portion that extends away from the shaft in a different (opposite) direction, each of the directions being orthogonal to the rotational axis and the longitudinal extent of the shaft 126. Each of the first and second portions of the third agitator 124c are shaped as planar bars in the illustrated example, but might have a different shape in other examples.

FIGS. 4A-E show external views of a further example of the apparatus 300, and FIGS. 5A-C show respective see-through views of the further example of the apparatus 300. The apparatus 300 of FIGS. 4 and 5 comprises the features shown and described above in relation to the apparatus 100 of FIG. 1, and may optionally comprise the features shown and described above in relation to FIGS. 2 and 3.

The hopper 110 in FIGS. 4 and 5 comprises an opening 330 for receiving pellets. The apparatus 300 may further comprise a lid 350 for covering the opening 330 of the hopper 110. In this example, the lid 350 is attached to the hopper 110 by a hinge. The lid 350 may be at least partially transparent. For example, it may be that the lid 350 is made from glass or a transparent plastic.

A safety switch 352 may be provided which may provide inputs to the control circuitry 210. The safety switch 352 may be located on the lid 350, as is the case in this example, or the main body of the hopper 110. The control circuitry 210 may prevent the agitator arrangement 120 from operating while the lid 350 is open. In some embodiments, the absence of an input from the safety switch prevents the control circuitry 210 from initiating the motor 122. The control circuitry 210 may prevent initiation of the motor 122 unless the safety switch 352 indicates that the lid 350 is closed.

The apparatus 300 may further comprise a filter 360 located near the opening 330 of the hopper 110. The filter 360 is configured to filter out items having dimensions exceeding predefined minimum dimensions from entering the hopper 110 through the opening 330.

In this example, the filter 360 comprises a filtration grid comprising a plurality of cells. The filtration grid 360 is configured to filter out an item having dimensions exceeding the dimensions of an individual cell from entering the hopper 110 through the opening 330. In this regard, the cells of the filtration grid 360 are sized to enable individual pellets to pass through the cells, but to prevent larger items from entering the hopper 110 through the opening 330. The filter/filtration grid 360 may be connected to the hopper 110 by a hinge. It might or might not be removable.

As explained above, at least a part of the agitator arrangement 120 may be located inside the hopper 110. That is, at least one agitator 124 and its agitation surface 125 may be located inside the hopper 110. In the example of the apparatus 300 illustrated in FIG. 4, the agitator arrangement 120 is the same as that illustrated in FIG. 3 and, as a consequence, the first, second and third agitators 124a-124c and their agitation surfaces 125a-c are located in the hopper 110. As shown, the first, second and third agitators 124a-c are located adjacent to a bottom inner surface 310 of the hopper 110.

The agitator arrangement 120 of the apparatus 300 comprises at least one motor 122 external to the hopper 110. The motor(s) 122 may form part of a drive. The drive might also comprise one or more gearboxes or variable-frequency drives (coupled to the motor(s) 122).

Figure 6:
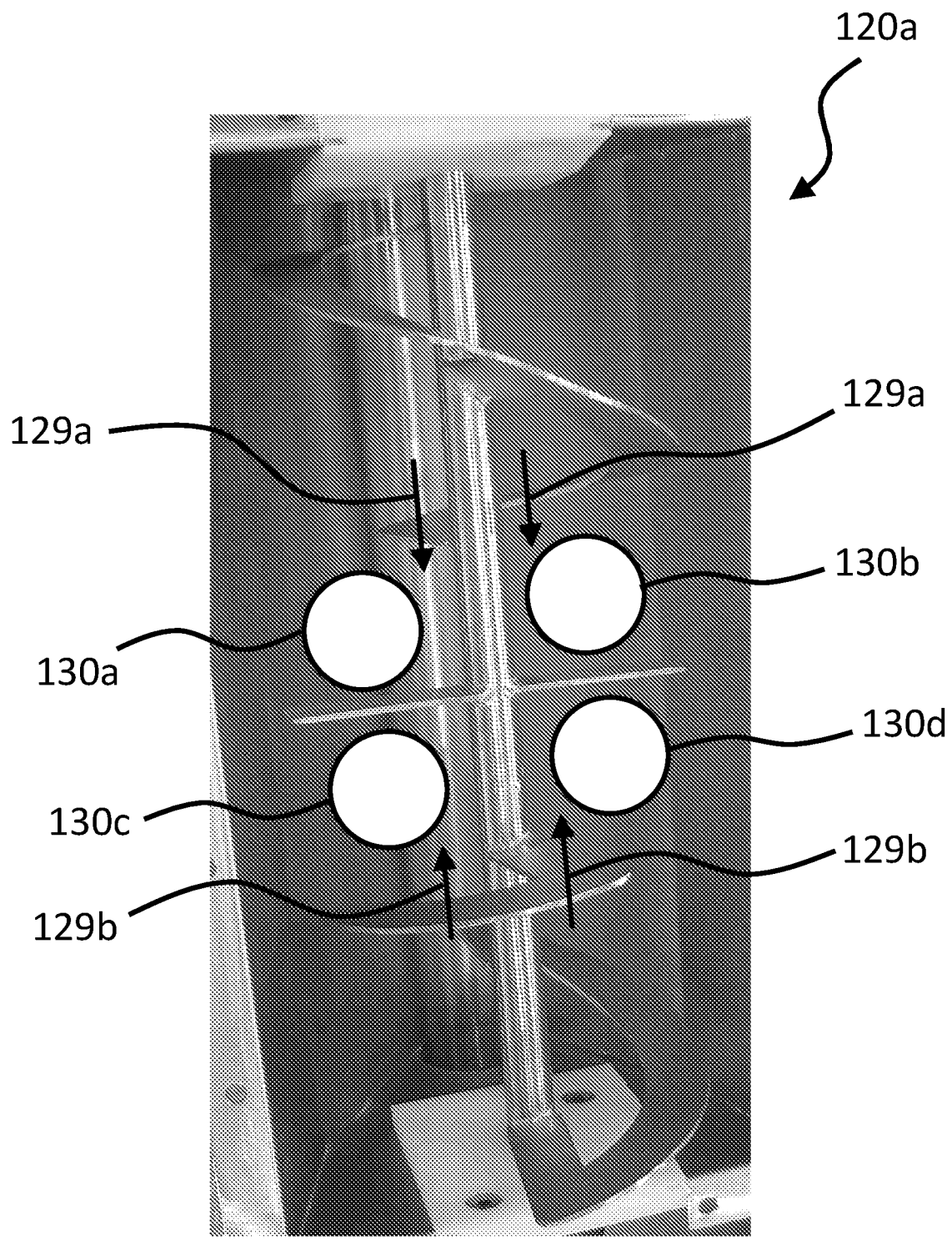
FIG. 6 shows an example of outlet locations.

The apparatus 300 comprises a hopper 110 and a plurality of outlets 130a-d located inside the hopper 110. The location of the outlets 130a-130d is shown in FIG. 6. While four outlets 130a-d are provided in this example, in other examples a different number of outlets 130a-130d might be provided, including only one. It can be seen that the third agitator 124c is located proximal to the outlets 130a-d.

The apparatus 300 of FIGS. 4 and 5 comprises one or more conduits 320, where each outlet 130a-130d is connected to and/or provided by a different conduit 320. The conduits 320 are for conveying pellets from the hopper 110. Each outlet 130a-130d is an entrance of a distal end of a conduit 320. Each conduit 320 extends into and through a wall of the hopper 110 in the illustrated example, but one, some or all of the conduits 320 could instead extend through the opening 330. The outlets 130a-d are typically located below the rotational axis of the shaft 126.

At least one surface of the hopper 110 may comprise a viewing window 390. The viewing window 390 may enable a user of the apparatus 300 to view inside the hopper 110. The viewing window 390 may be located to enable a user of the apparatus 300 to view at least a portion of the agitator arrangement 120 housed inside the hopper 110.

The apparatus 300 may comprise one or more of castors 370. In the illustrated example there are four castors 370, but any number may be used. The castors 370 are configured to allow the apparatus 300 to be moved across a surface, such as a factory floor. It may be that the castors 370, or some of the castors 370, comprise a respective brake 380 for inhibiting movement of the apparatus 300 across the surface.

Figure 7:
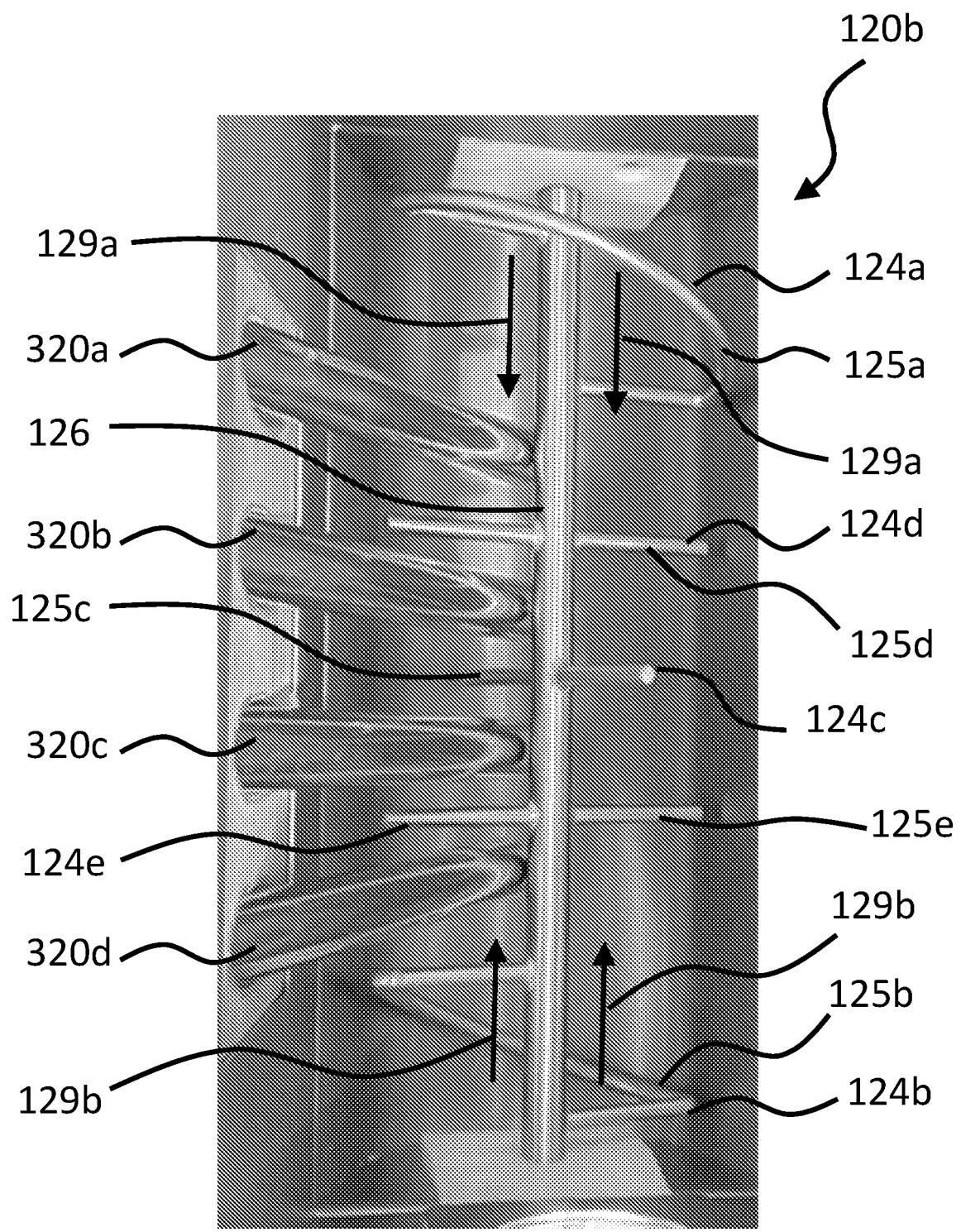
FIG. 7 shows a second example of at least a part of an agitator arrangement.
Figures 8A, 8B:
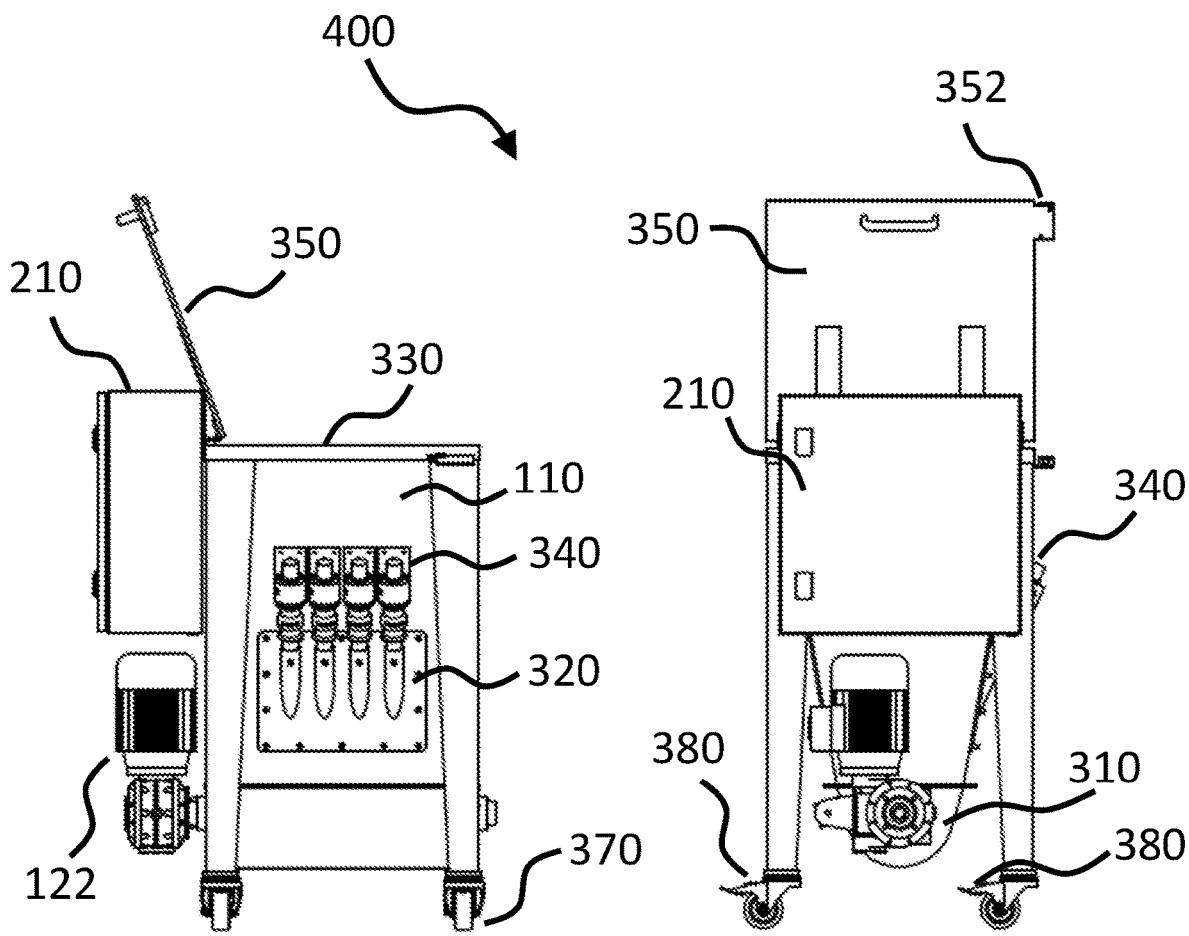
FIG. 8A is a side view of another example of the apparatus.
FIG. 8B is a rear view of the other example of the apparatus.
Figure 8C:
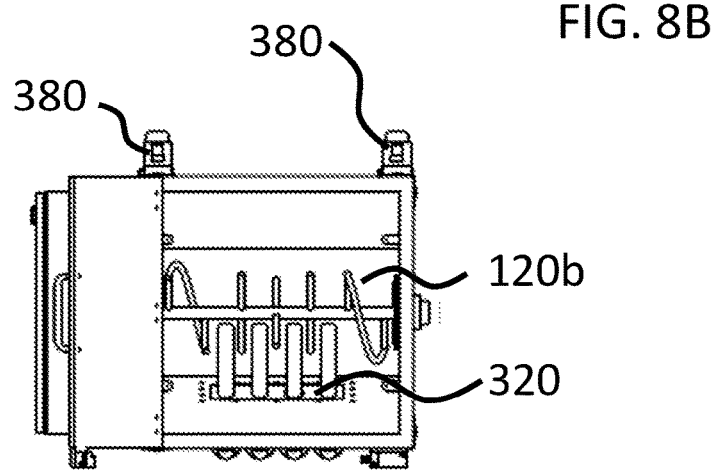
FIG. 8C is a plan view of the other example of the apparatus.
Figures 8D, 8E:
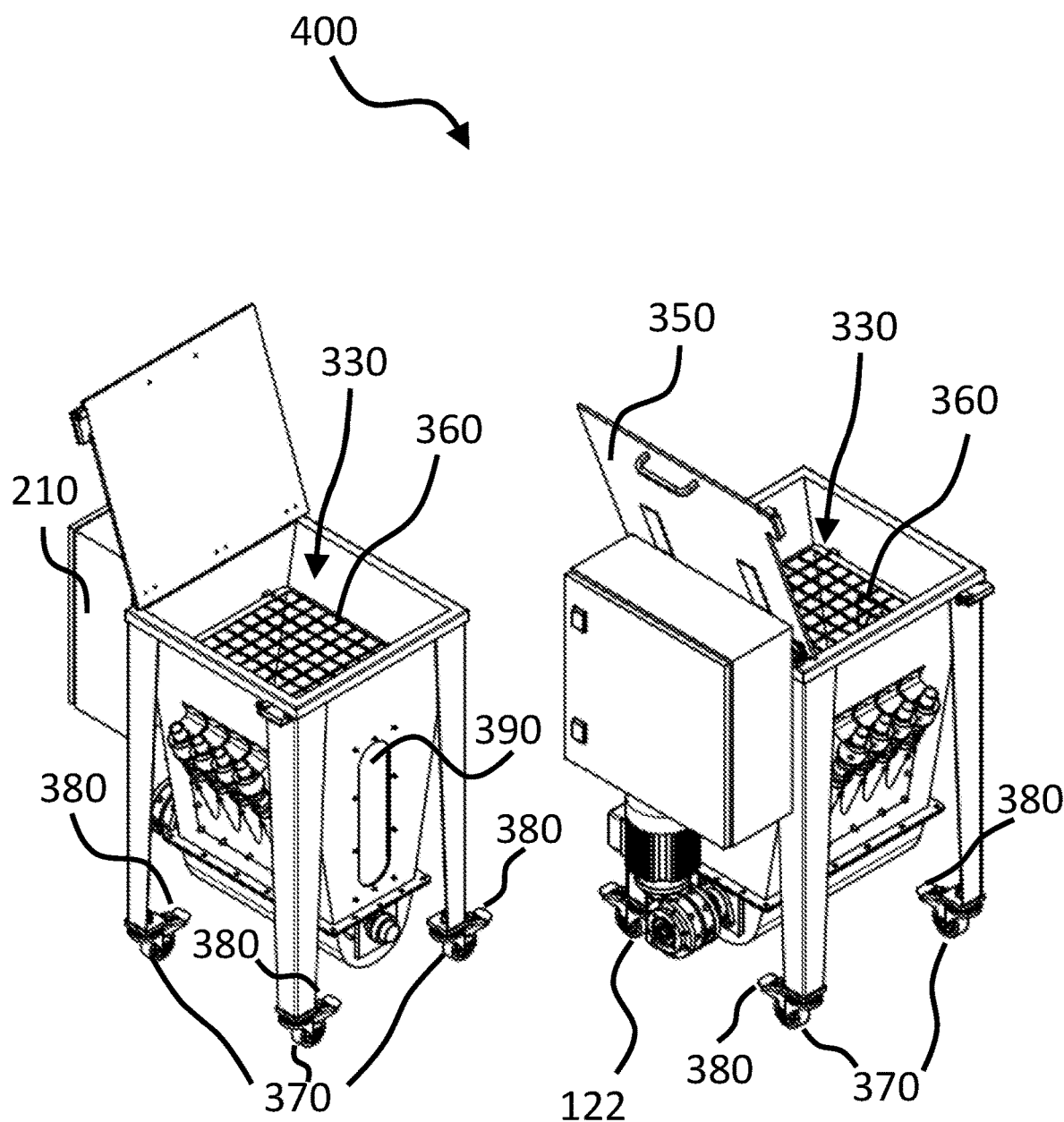
FIG. 8D is a first perspective view of the other example of the apparatus.
FIG. 8E is a second perspective view of the other example of the apparatus.

FIG. 7 illustrates a second example of at least part of an agitator arrangement 120b. The agitator arrangement 120b and outlets 130a-d illustrated in FIG. 7 operate in a similar manner as those illustrated and described above in relation to FIGS. 3 and 6.

The agitator arrangement 120b illustrated in FIG. 7 comprises a fourth agitator 124d and a fifth agitator 124e. The fourth agitator 124d is positioned between the first agitator 124a and the third agitator 124c in the dimension that is parallel to or co-incident with the longitudinal extent of the shaft 126 and the axis of rotation. The fourth agitator 124d is shaped as an elongated cylindrical bar and extends away from the shaft 126 in at least one direction that is orthogonal to the rotational axis and the longitudinal extent of the shaft 126. The fourth agitator 124d is elongated in a direction perpendicular to the direction the third agitator 124c elongates. In the illustrated example, the fourth agitator 124d comprises two portions: a first portion that extends away from the shaft in one direction, and a second portion that extends away from the shaft in a different (opposite) direction, each of the directions being orthogonal to the rotational axis and the longitudinal extent of the shaft 126.

The fifth agitator 124e is positioned between the second agitator 124b and the third agitator 124c in the dimension that is parallel to or co-incident with the longitudinal extent of the shaft 126 and the axis of rotation. The fifth agitator 124e is shaped as an elongated cylindrical bar and extends away from the shaft 126 in at least one direction that is orthogonal to the rotational axis and the longitudinal extent of the shaft 126. The fifth agitator 124e is elongated in a direction perpendicular to the direction the third agitator 124c elongates. In the illustrated example, the fifth agitator 124e comprises two portions: a first portion that extends away from the shaft in one direction, and a second portion that extends away from the shaft in a different (opposite) direction, each of the directions being orthogonal to the rotational axis and the longitudinal extent of the shaft 126. In the illustrated example, the fourth agitator 124d and the fifth agitator 124e are elongated in the same direction.

The fourth and fifth agitators 124d-e operate in the same way as the third agitator 124c described above. The third, fourth and fifth agitators 124c-e are shaped as elongated cylindrical bars in the illustrated example, but might have a different shape in other examples.

The agitation surfaces 125a-e of the agitator arrangement 120b illustrated in FIG. 7 are curved, but might have a different shape in other examples.

The conduits 320a-d in this illustrated example are aligned on the same side of the longitudinal extent of the shaft 126 and the axis of rotation. In the illustrated example, the conduits 320a-d extend into and through one wall of the hopper 110, but one, some or all of the conduits 320a-d could instead extend through the opening 330 of the hopper 110. As described above, each outlet 130a-d is an entrance of a distal end of a conduit 320a-d. The outlets 130a-d are typically located below the rotational axis of the shaft 126 (see for example FIG. 9A).

Figures 9A, 9B, 9C:
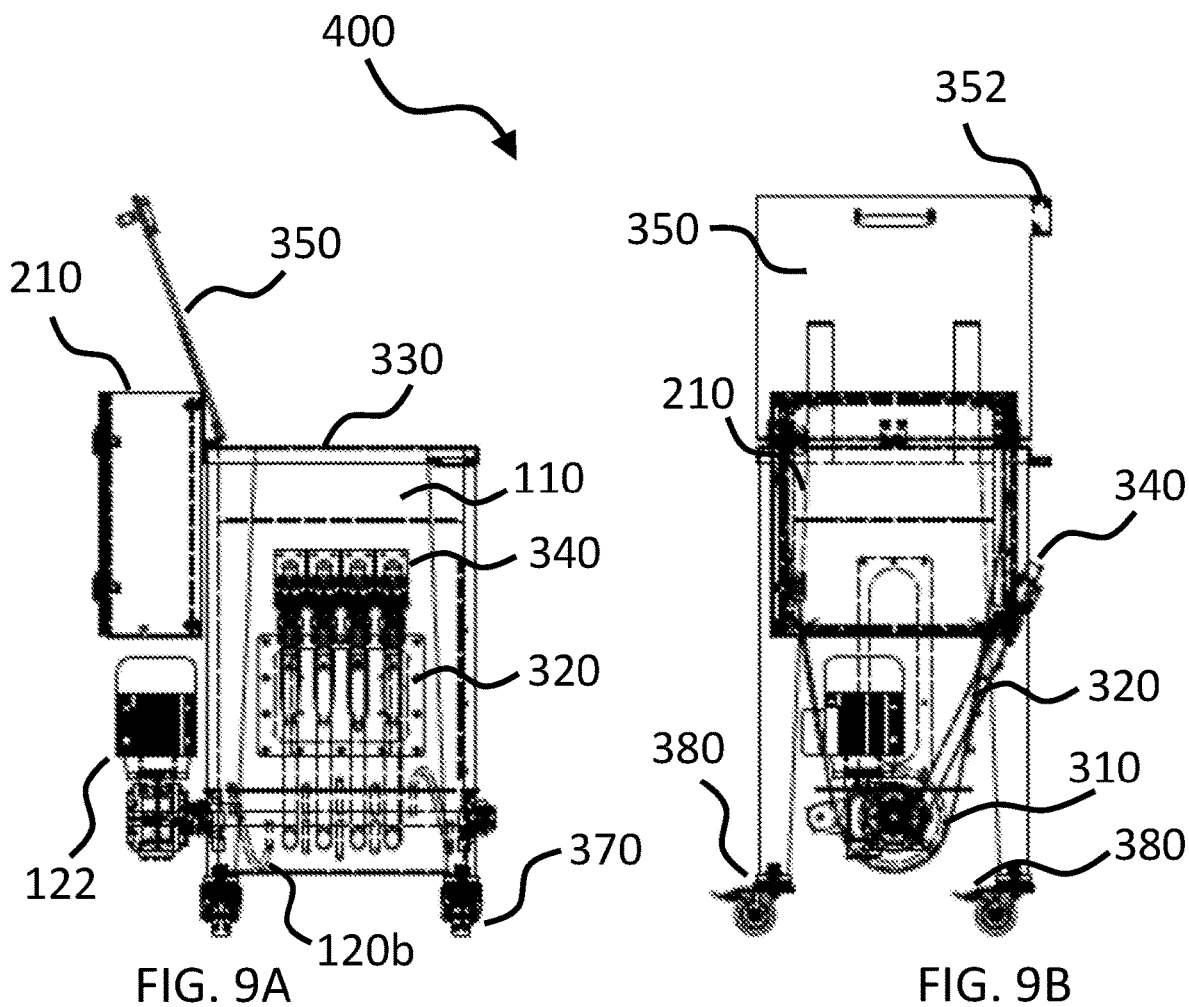
FIG. 9A is a see-through side view of the other example of the apparatus.
FIG. 9B is a see-through rear view of the other example of the apparatus.
FIG. 9C is a see-through plan view of the other example of the apparatus.

FIGS. 8A-E show external views of another example of the apparatus 400, and FIGS. 9A-C show respective see-through views of the other example of the apparatus 400. The apparatus 400 of FIGS. 8 and 9 is largely the same as the apparatus shown and described above in relation to the apparatus 300 of FIGS. 4 and 5, with the differences described below. The apparatus 400 may comprise the features shown and described above in relation to FIGS. 2 and 7.

The apparatus 400 comprises a hopper 110 and a plurality of outlets 130a-d located inside the hopper 110. The location of the outlets 130a-130d can be seen in FIG. 7. In this illustrated example, the conduits 320a-d are located along the same wall of the hopper 110. While four conduits 320a-d and four outlets 130a-d are provided in this example, in other examples a different number of conduits 320a-d and outlets 130a-130d might be provided, including only one. It can be seen that the third, fourth and fifth agitators 124c-e are located proximal to the outlets 130a-d.

As explained above, at least a part of the agitator arrangement 120 may be located inside the hopper 110. That is, at least one agitator 124 and its agitation surface 125 may be located inside the hopper 110. In the example of the apparatus 400 illustrated in FIG. 8, the agitator arrangement 120 is the same as that illustrated in FIG. 7 and, as a consequence, the first, second, third, fourth and fifth agitators 124a-124e and their agitation surfaces 125a-e are located in the hopper 110. As shown, the first, second, third, fourth and fifth agitators 124a-e are located adjacent to a bottom inner surface 310 of the hopper 110.

As illustrated in FIGS. 8-9, the control circuitry 210 may be attached to the hopper 110.

Operation of the apparatus 100, 200, 300, 400 will now be described in relation to a first method 1000 illustrated in FIG. 10.

The control circuitry 210 may activate the agitator arrangement 120 in response to user input provided at user input circuitry (e.g., a switch) that is connected to the control circuitry 210. Activation of the agitator arrangement 120 may comprise initiation of the motor 122. In response to such initiation, in the context of the agitator arrangement 120a at least partially illustrated in FIG. 3, the motor 122 may begin to rotate the shaft 126, causing the first, second and third agitators 124a-124c to rotate with the shaft 126. In the context of the agitator arrangement 120b at least partially illustrated in FIG. 7, the motor 122 may begin to rotate the shaft 126, causing the first, second, third, fourth and fifth agitators 124a-124e to rotate with the shaft 126.

Figure 10:
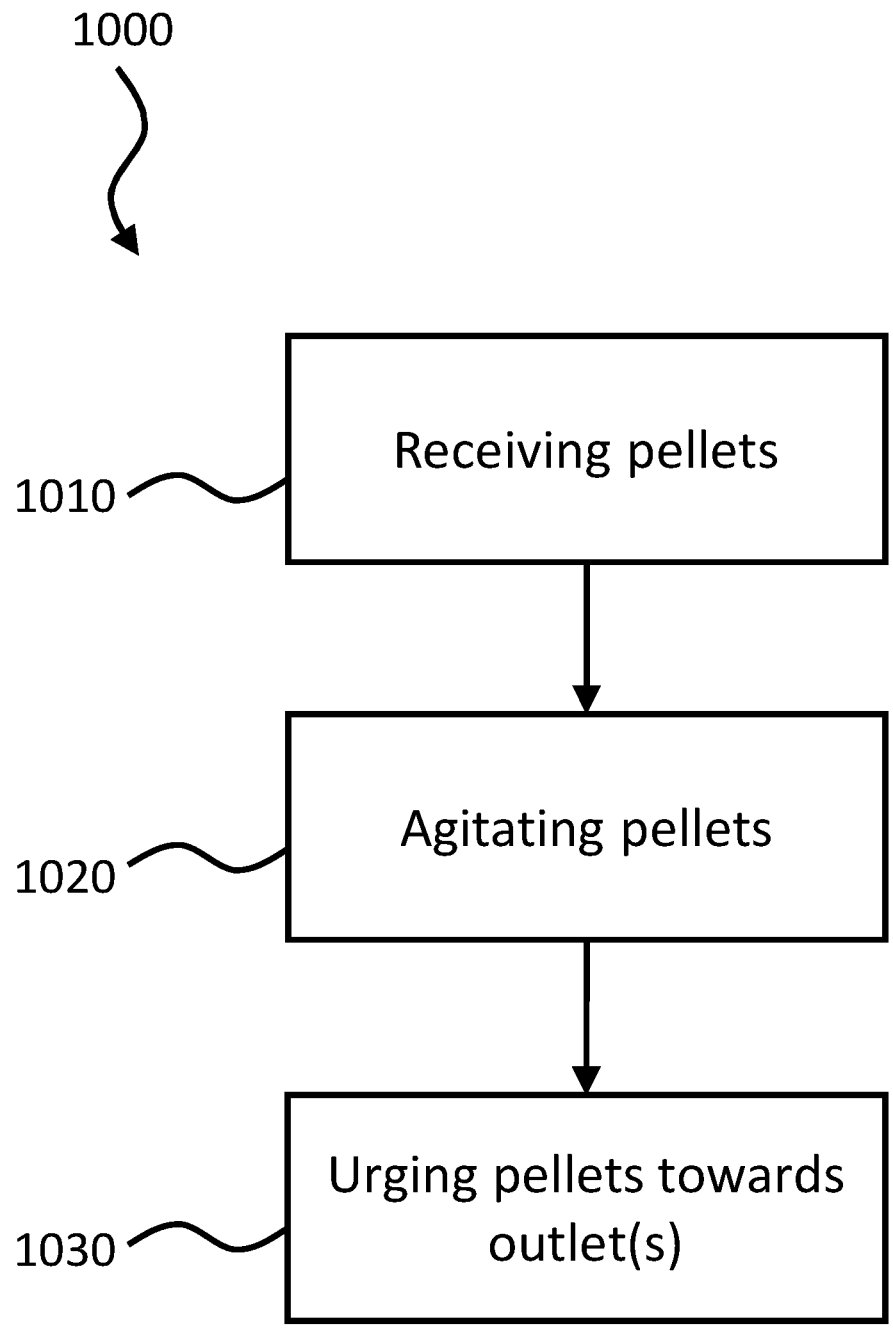
FIG. 10 is a schematic diagram of the apparatus of FIG. 2 in a production line.

At block 1010 in FIG. 10, pellets are received by the hopper 110. This may involve a user manually inserting the pellets into the hopper 110, or a machine inserting the pellets in the hopper 110. The pellets may be received by the hopper 110 before and/or after the activation of the agitator arrangement 120 described above.

Figure 11A:

FIG. 11A illustrates an example of a plurality of pellets 1100. In this example, the pellets 1100 are shaped as pillows, but might have a different shape in other examples. The pellets 1100 may be hot melt pellets. Such hot melt pellets may comprise an adhesive material stored inside a hard outer shell. The hard outer shell may be meltable and/or dissolvable. In other examples, different types of bulk material and pellets might be used, such as (but not limited to), pharmaceuticals, resin pellets, pelletized chemicals, or foodstuff, such as confectionary (e.g., chewing gum).

Figure 11B:
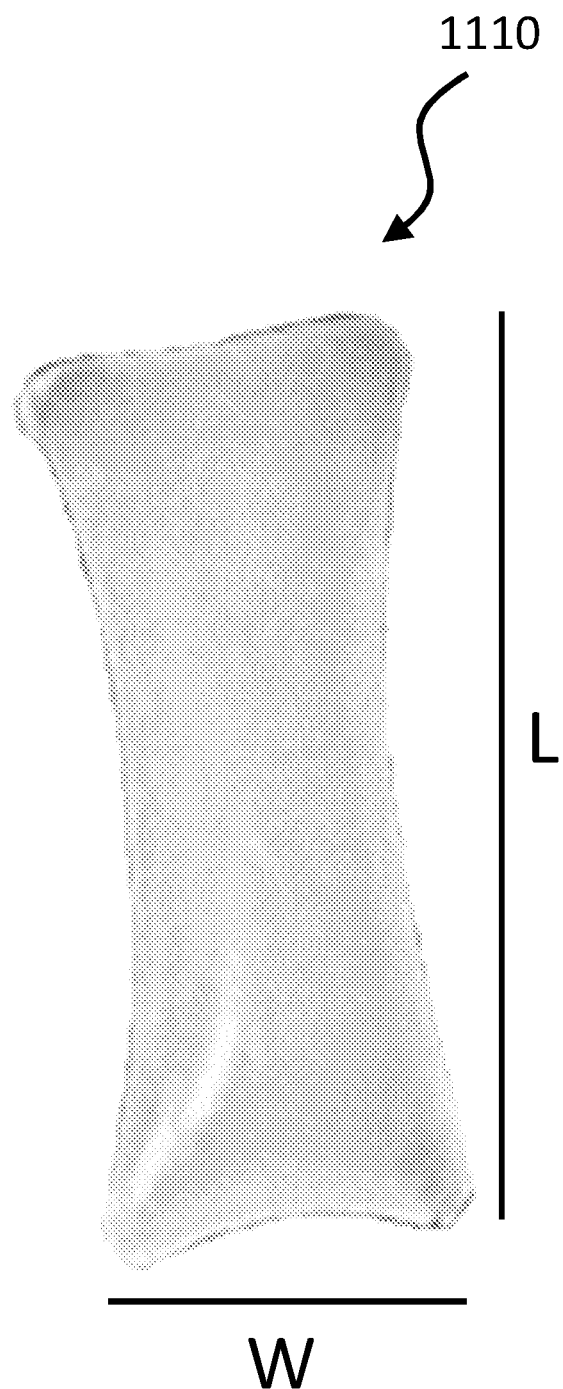

FIG. 11B illustrates an example of an individual pellet. An individual pellet 1110 has a length L and a width W. The depth of the pellet is orthogonal to the length L and the width W. The dimensions of the cells in the filtration grid 360 are at least large enough to enable a pellet to fit through the filtration grid 360. The pellet 810 may, for instance, have a width in the range 2-20 mm, a length of in the range 2-50 mm and a depth in the range 2-20 mm. Typically, the pellet 1110 may have a width of 6 mm, a length of 12 mm and a depth 4 mm.

As explained above, the pellets 1100 may have a cohesive nature. For example, exposure to ambient conditions may cause the pellets 1100 to stick together.

In order to counteract cohesion of the pellets 1100 in the hopper 110, at block 1020 the pellets 1100 are agitated in the hopper 110 by the agitator arrangement 120. In order to enable the pellets 1100 to be extracted and conveyed through the outlets 130a-130d and out of the hopper 110, the agitator arrangement 120 also urges the pellets towards the outlets 130a-d. The agitation and the urging of the pellets may be performed substantially simultaneously by the agitator arrangement 120.

In the context of the agitator arrangements 120a-b at least partially illustrated in FIGS. 3 and 7 respectively, each of the agitators 124a-e agitates pellets 1100 in the hopper 110 to counteract cohesion. This restricts or prevents the sticking together of at least some of the pellets in the hopper 110. The first agitator 124a and its agitation surface 125a, through their rotary movement, agitate pellets and urge them in at least the first direction 129a towards the outlets 130a-130d. The second agitator 124b and its agitation surface 125b, through their rotary movement, agitate pellets and urge them in at least the second direction 129b towards the outlets 130a-130d. Pellets are urged in the first direction and the second direction at the same time.

The movement of pellets towards each other in the first direction 129a and the second direction 129b might cause the pellets to clump together between the two agitators 125a, 125b in the vicinity of the outlets 130a-d. The third, fourth and fifth agitators 124c-e, through their rotary motion, limit or prevent this clumping, thereby enabling the pellets to be more easily extracted/conveyed from the outlets 130a-d.

The method 1000 further comprises urging pellets towards at least one outlet 1030. The illustrated examples of the agitator arrangement 120a of apparatus 300 (shown in FIGS. 3-6) and the agitator arrangement 120b of apparatus 400 (shown in FIGS. 7-9) comprise two agitators 124a, 124b configured to urge pellets in a first and second direction. The nature of the agitators 124a, 124b results in agitating the pellets 1100 and urging the pellets towards at least one outlet 1030 being performed at the same time. It is envisaged that in other examples of the agitators, that agitating 1020 and urging the pellets 1030 may be performed separately.

The helical shape of the agitation surfaces 125a, 125b agitates the pellets and urges them towards the outlet(s) 130a-d, while limiting the time pellets are in contact with the first and second agitation surfaces 125a, 125b. That is, the pellets may fall away from the agitation surfaces 125a, 125b during operation, typically at or near the highest point of the rotation of the agitation surfaces 125a, 125b, due to gravity. Prolonged contact with the agitation surfaces 125a, 125b may cause the pellets to heat up and stick together. The helical nature of the first and second agitators 124a, 124b also results in pellets being agitated regularly, therefore preventing pellets being stationary for too long.

As explained above, the control circuitry 210 might be configured to control the speed at which the motor 122 causes the agitators 124a-e to agitate the pellets. A user might provide input via user input circuitry to change the speed of rotation of the agitators 124a-e, based on the cohesiveness property of the pellets. That is, pellets which are more likely to stick together may require a different speed of agitation than pellets which are less likely to stick together. It may be that the agitator arrangement 120 is configured to enable different speeds of rotation, for example, through use of the gearbox or variable-frequency drive.

The part of the agitator arrangement 120 that is located in the hopper 110 may be positioned to optimise agitation. For example, at least the first and second agitators 124a, 124b (and possibly also the third, fourth and fifth agitators 124c-e) may be configured to have a clearance from the bottom inner surface 310 of the hopper 110 that is less than the smallest dimension of a pellet. As the first and second agitators 124a, 124b extend, in this example helically, around the shaft 126, at least one point on the agitators 124a, 124b (the agitation surfaces 125a, 125b) during rotation is closest to the bottom inner surface 310 of the hopper 110. The clearance is between this point on the agitators 124a, 124b, in at least one rotational position of the agitators 124a, 124b, and the bottom inner surface 310 of the hopper 110. As the clearance is less than the smallest dimension of a pellet, this prevents pellets from resting on the bottom of the hopper 110 without being agitated.

As mentioned above, the conduits 320 are for conveying the pellets away from the hopper 110 (e.g., in the context of adhesive pellets, towards a melting apparatus that are for melting the pellets to generate a liquid adhesive).

The pellets may be extracted/conveyed from the hopper 110 via the outlets 130 and the conduits 320 by suction. The apparatus 100, 200, 300, 400 may comprise one or more pressure control devices that generate a pressure differential in the conduits 320 to cause the pellets to be sucked into the outlets 130a-d and into the conduits 320. Each pressure control device may be or comprise a venturi vacuum pump, for example.

The apparatus 300 illustrated in FIGS. 4-5 and apparatus 400 illustrated in FIGS. 8-9 comprise one or more guides 340 for use in connecting conduits of the pressure control device to the conduits 320 that extend into the hopper 110 and provide the outlets 130a-130d.

The method 1000 may comprise activating the pressure control device before agitating the received pellets block 1020 of FIG. 10. This may ensure that the conveying conduits 320 are clear before use.

Figure 12:
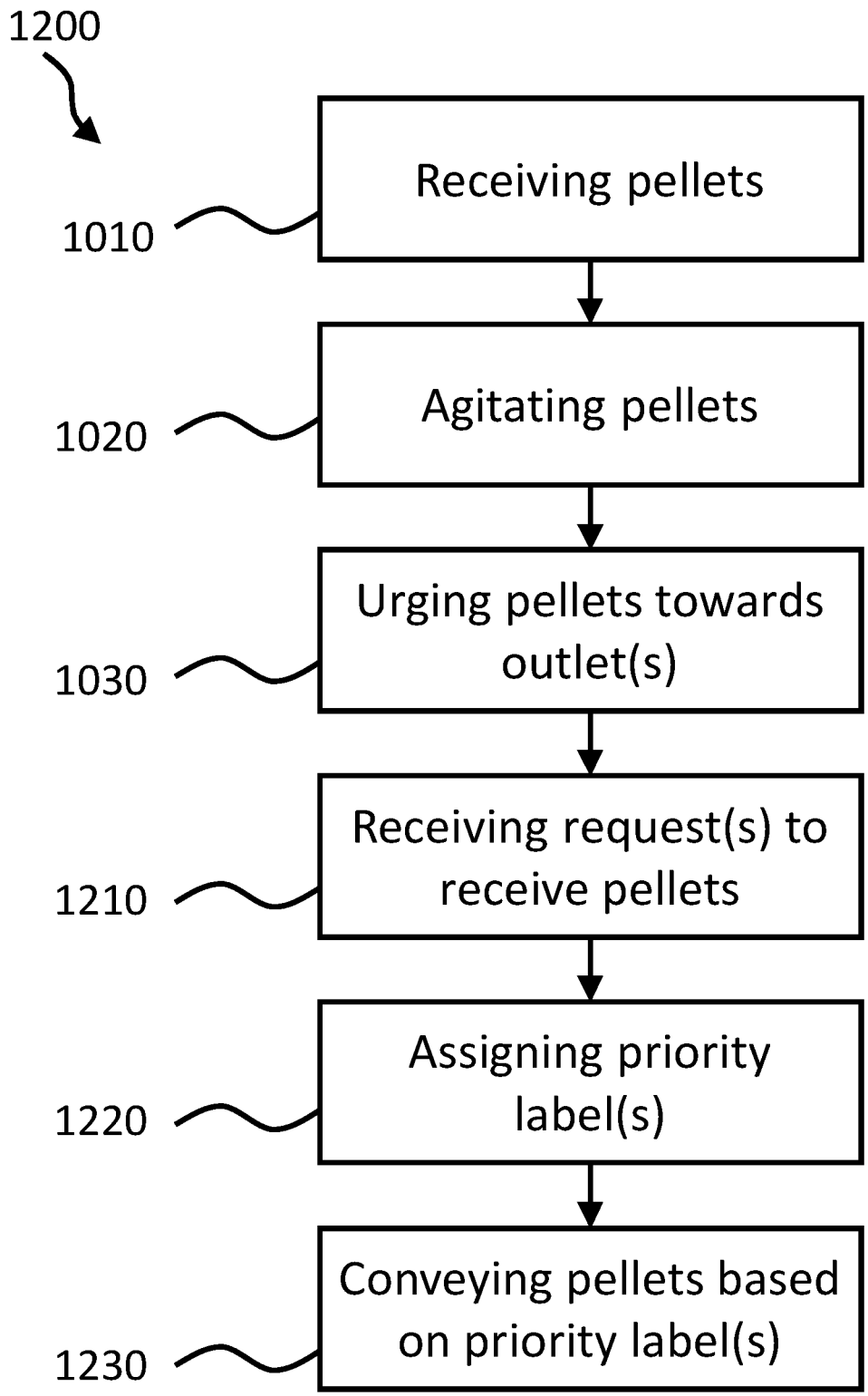
Figure 13:
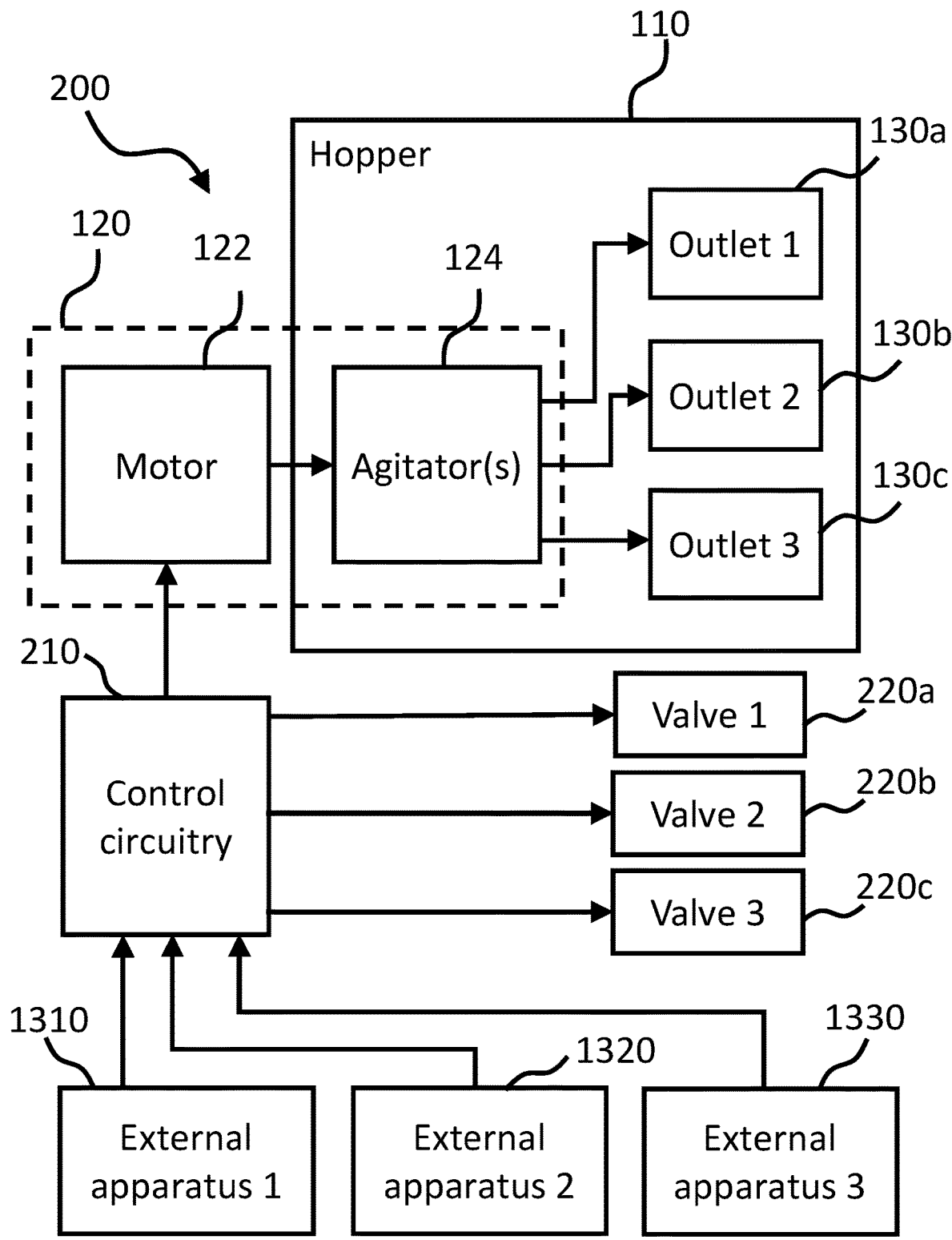

FIG. 12 shows a second method 1200, in which the control circuitry 210 of the apparatus 100, 200, 300, 400 receives requests from external apparatus(es) for conveying the pellets. FIG. 13 shows a schematic diagram of the apparatus 200 in a production line utilising the second method 1200, and includes the features described above in relation to FIGS. 1 and 2 and possibly also FIGS. 3 to 10.

The first three blocks of the second method 1200 are the same as those described above in relation to the first method 1000 and illustrated in of FIG. 10; that is, receiving pellets in the hopper 110 in block 1010, agitating pellets in the hopper 110 in block 1020 and urging pellets towards outlet (s) 130 in block 1030.

The second method 1200 further comprises, in block 1210, receiving one or more requests from one or more external apparatuses 1310, 1320, 1330. Each request is a request from the one or more external apparatuses 1310, 1320, 1330 to receive pellets. In this regard, the apparatus 200 may comprise one or more receivers for receiving wireless or wired signals that is operationally coupled to the control circuitry 210. The control circuitry 210 is configured to receive the requests from the external apparatus 1310, 1320, 1330, via the receiver(s), and act upon them. This is illustrated in FIG. 13, where the external apparatuses 1310, 1320, 1330 communicate(s) with the control circuitry 210.

Each external apparatus 1310, 1320, 1330 is pneumatically connectable to the apparatus 200 via a respective conduit 320 and a respective outlet 130a-c. At least one valve 220a, 220b, 220c may be associated with each outlet 130a-c. For example, a first valve 220a may be associated with a first outlet 130a, a second valve 220b may be associated with a second outlet 130b and a third valve 130c may be associated with a third outlet 130c. The valves 220a, 220b, 220c are controllable by the control circuitry 210. For example, the control circuitry 210 may control each valve 220a, 220b, 220c. The controlling of the valve 220a, 220b, 220c may control whether a particular conduit 320 and its outlet 130a-c are pneumatically connected to an external apparatus 1310, 1320, 1330.

For example, the opening of the first valve 220a may pneumatically connect the apparatus 200 to the first external apparatus 1310 via the first outlet 130a. Upon pneumatic connection of the apparatus 200 and the first external apparatus 1310, pellets may be conveyed (e.g., due to a pressure differential caused by a pressure control device as explained above) from the hopper 110, through the first outlet 130a and to the first external apparatus 1310.

The closing of the first valve 220a may pneumatically disconnect the apparatus 200 from the first external apparatus 1310. Upon pneumatic disconnection of the apparatus 200 and the first external apparatus 1310, pellets may cease to be conveyed from the apparatus 200 to the first external apparatus 1310.

The opening of the second valve 220b may pneumatically connect the apparatus 200 to the second external apparatus 1320 via the second outlet 130b. Upon pneumatic connection of the apparatus 200 and the second external apparatus 1320, pellets may be conveyed (e.g., due to a pressure differential caused by a pressure control device as explained above) from the hopper 110, through the second outlet 130b and to the second external apparatus 1320.

The closing of the second valve 220b may pneumatically disconnect the apparatus 200 from the second external apparatus 1320. Upon pneumatic disconnection of the apparatus 200 and the second external apparatus 1320, pellets may cease to be conveyed from the apparatus 200 to the second external apparatus 1320.

The opening of the third valve 220c may pneumatically connect the apparatus 200 to the third external apparatus 1330 via the third outlet 130c. Upon pneumatic connection of the apparatus 200 and the third external apparatus 1330, pellets may be conveyed (e.g., due to a pressure differential caused by a pressure control device as explained above) from the hopper 110, through the third outlet 130c and to the third external apparatus 1330.

The closing of the third valve 220c may pneumatically disconnect the apparatus 200 from the third external apparatus 1330. Upon pneumatic disconnection of the apparatus 200 and the third external apparatus 1330, pellets may cease to be conveyed from the apparatus 200 to the third external apparatus 1330.

In response to the reception of a request for pellets from an external apparatus 1310, 1320, 1330 the control circuitry 210 may respond to that request by determining whether a previous request for pellets is currently being fulfilled. If not, the control circuitry 210 to the request by opening the relevant valve 220a, 220b, 220c to pneumatically connect the external apparatus 1310, 1320, 1330 to the apparatus 200, cause pellets to be conveyed to the external apparatus 1310, 1320, 1330.

It may be that if the apparatus 200 were pneumatically connected to all (or a plurality) of the external apparatuses 1310, 1320, 1330 simultaneously, a pressure reduction would result in the conduits 320 that would result in pellets being conveyed ineffectively or not at all. Consequently, the control circuitry 210 may be configured to cause the apparatus 200 to pneumatically connect to a single external apparatus 1310, 1320, 1330 at any one time, or a subset of the external apparatuses 1310, 1320, 1330.

Thus, in some embodiments, if a request to receive pellets is received from an external apparatus 1310, 1320, 1330 while a previous request is currently being fulfilled, the control circuitry 210 might not cause the apparatus 200 to fulfil the request until the previous request has been fulfilled (e.g., by waiting to pneumatically connect the relevant external apparatus 1310, 1320, 1330 to the apparatus 200 by, for instance, opening the relevant valve 220a, 220b, 220c).

If multiple requests to receive pellets are received from an external apparatus 1310, 1320, 1330 while a previous request is currently being fulfilled, the control circuitry 210 may prioritise the requests before they are fulfilled. This may be done by assigning priority labels to the requests in block 1220 in FIG. 12.

In some embodiments, each outlet 130a-c/external apparatus 1310, 1320, 1330 is weighted similarly and the priority label is based on a first-come, first-served basis. In other embodiments, it may be that each outlet 130a-c/external apparatus 1310, 1320, 1330 has a weighting associated with it, and the priority label is based on the associated weighting. That is, some outlets 130 may require a higher priority label over other outlets 130. The outlets 130 are queued based on the assigned priority label.

In block 1230 in FIG. 12, pellets are conveyed based on the priority label(s). That is, conveyance of pellets to the external apparatuses 1310, 1320, 1330 via outlets 130a-c depends on the priority label of the outlet 130a-130c.

It may be that the control circuitry 210 of FIG. 13 is configured to dynamically assess the priority label(s). During conveyance, the control circuitry 210 may control the number of pellets conveyed, or the time of conveyance, to each external apparatus 1310, 1320, 1330 based on the queue. That is, if the queue consists of one request, the control circuitry 210 may convey pellets to the associated external apparatus 1310, 1320, 1330 until the external apparatus 1310, 1320, 1330 has received enough. Alternatively, if the queue consists of multiple requests, the control circuitry 210 may determine to provide a small number of pellets to each external apparatus 1310, 1320, 1330 before returning to the start of the queue to provide a greater number of pellets, or provide a large number of pellets to each external apparatus 1310, 1320, 1330 in queue-order.

It may be that the control circuitry 210 is configured to dynamically assess new requests and re-prioritize the queue accordingly. For example, method 1200 may return to receiving requests 1210 and assigning priority labels 1220 while conveying pellets 1230. For example, if a second external apparatus 1320, with a higher weighting, requests pellets while pellets are being conveyed to a first external apparatus 1310, the control circuitry 210 may stop conveying pellets to the first external apparatus 1310 and start conveying pellets to the second external apparatus 1320, based on a new priority order.

The method 1200 may further comprise receiving, at the control circuitry 210 (e.g., via a receiver for receiving wireless or wired signals), a signal to stop conveyance of pellets. For example, the signal may be from an external apparatus 1310, 1320, 1330 receiving conveyed pellets from the hopper 110, informing the control circuitry 210 that it has received enough pellets, for example based on a level sensor. In other examples, it may be that the signal is based on the number of pellets conveyed to the external apparatus 1310, 1320, 1330. It may be that the signal is based on a predetermined length of time for conveying to a given external apparatus 1310, 1320, 1330.

The control circuitry 210, in response to receiving the signal to stop conveying, may close the appropriate valve 220a, 220b, 220c to stop conveyance of pellets to the associated external apparatus 1310, 1320, 1330. The control circuitry 210 may then assess the priority labels and, if applicable, begin conveying to the next appropriate external apparatus 1310, 1320, 1330.

The method 1200 may comprise, prior to stopping conveyance to a given external apparatus, clearing the conduit to the external apparatus 1310, 1320, 1330 before conveying pellets to the next appropriate external apparatus 1310, 1320, 1330. For example, it may be that the agitator arrangement 120 is turned off (e.g., the motor 122 is switched off), stopping the urging of pellets to the associated outlet 130, while pellets are still being extracted via an outlet 130a-c. This may remove pellets in a volume near the outlet 130a-c such that no further pellets can be conveyed from that outlet 130. It may be that the associated valve 222, 220b, 220c of the outlet 130a-c comprises a Y-connector such that closing the valve 220a, 220b, 220c restricts conveyance of the pellets from the hopper 110 while still allowing the conduit 320 to be cleared of pellets. For example, when the pellets are conveyed by suction, it may be that closing the associated valve 220a, 220b, 220c to the outlet 130a-c maintains suction along the conduit 320, but restricts conveyance of the pellets from the hopper 110, therefore clearing the conduit 320 by conveying the pellets remaining within the conduit 320.

Where the pellets are hot melt pellets, one or more of the external apparatuses 1310, 1320, 1330 may, for example, be a melting apparatus configured to melt, and potentially administer, the hot melt pellets. In other examples (e.g., if the pellets are a foodstuff), the external apparatus 1310, 1320, 1330 may be a packaging apparatus configured to package the pellets.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims. For example, the agitator(s) 124 need not have the same shape as those illustrated in FIGS. 3, 4C, 5A, 5C, 6, 7, 8C, 9A and 9C. Three agitators 124*a-c* need not be provided as shown in the example illustrated in FIGS. 3, 4C, 5A, 5C and 6, and five agitators 124*a-e* need not be provided as shown in the example illustrated in FIGS. 7, 8, 9A and 9C. For example, a single agitator 124*a* might be provided that has a single agitation surface 125*a*. At least a portion of the single agitation surface 125*a* might be helical in shape and might be provided by a single ribbon screw.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavouring in the foregoing specification to draw attention to those features believed to be of importance it should be understood that the applicant may seek protection via the claims in respect of any patentable feature or combination of features hereinbefore referred to and/or shown in the drawings whether or not emphasis has been placed thereon.

We claim:

1. An apparatus for receiving and conveying bulk material, comprising:
   a hopper for receiving bulk material;
   a plurality of outlets, each outlet configured to enable bulk material, received by the hopper, to exit the hopper, wherein each of the plurality of outlets comprises a valve configured to allow or restrict conveyance of the bulk material via the outlet;
   an agitator arrangement configured to agitate the bulk material in the hopper in order to counteract cohesion of the bulk material, wherein the agitator arrangement is configured to urge the bulk material in the hopper towards the plurality of outlets; and
   control circuitry configured to assign a priority label to each of the plurality of outlets, and configured to control the conveyance of bulk material through the plurality of outlets based on the priority label.

2. The apparatus according to claim 1, wherein the agitator arrangement comprises at least one agitation surface for agitating the bulk material in order to counteract cohesion of the bulk material, and for urging the bulk material towards the plurality of outlets.

3. The apparatus according to claim 2, wherein the agitation surface is at least partially helical in shape.

4. The apparatus according to claim 2, wherein the agitator arrangement comprises a ribbon screw, and the at least one agitation surface at least partially provided by the ribbon screw.

5. The apparatus according to claim 2, wherein the at least one agitation surface is configured to rotate about a rotational axis.

6. The apparatus according to claim 5, wherein the agitator arrangement comprises a shaft aligned with the rotational axis and at least a portion of the at least one agitation surface extends around the shaft.

7. The apparatus according to claim 6, wherein the plurality of outlets is located below the rotational axis of the shaft.

8. The apparatus according to claim 6, wherein at least a portion of the at least one agitation surface extends helically around the shaft.

9. The apparatus according to claim 6, wherein the at least one agitation surface is fixed in position relative to the shaft.

10. The apparatus according to claim 6, wherein at least a portion of the shaft, and the at least one agitation surface are housed within the hopper, and wherein in at least one rotational position of the shaft, a clearance between a portion of the agitation surface and at least one inner surface of the hopper is less than the smallest dimension of the received bulk material.

11. The apparatus according to claim 1, wherein the plurality of outlets is connected to a conduit for conveying the bulk material away from the hopper.

12. The apparatus according to claim 1, wherein the hopper comprises an opening for receiving bulk material and the apparatus further comprises a filter covering the opening, the filter being configured to filter out items having dimensions exceeding predefined minimum dimensions from entering the hopper through the opening.

13. The apparatus according to claim 12, wherein the filter comprises a filtration grid comprising a plurality of cells, the filtration grid being configured to filter out an item having dimensions exceeding the dimensions of an individual cell from entering the hopper through the opening.

14. The apparatus according to claim 2, wherein the agitator arrangement comprises a first agitator configured to urge the bulk material in at least a first direction, and a second agitator configured to urge the bulk material in at least a second direction.

15. The apparatus according to claim 14, wherein the first agitator is configured to urge the bulk material in at least the first direction towards the plurality of outlets, and the second agitator is configured to urge the bulk material in at least the second direction towards the plurality of outlets.

16. The apparatus according to claim 15, wherein the second direction is opposite to the first direction.

17. The apparatus according to claim 15, wherein the first direction and second direction are aligned with a first dimension, and the agitator arrangement comprises a third agitator, configured to agitate the bulk material in the hopper, positioned between the first agitator and the second agitator in the first dimension.

18. The apparatus according to claim 17, wherein the third agitator is located proximal to the plurality of outlets.

19. The apparatus according to claim 17, wherein the at least one agitation surface is configured to rotate about a rotational axis, wherein the at least one agitation surface comprises a first agitation surface provided by the first agitator and a second agitation surface provided by the second agitator, and the rotational axis is parallel or co-incident with the first dimension.

20. The apparatus according to claim 17, wherein the agitator arrangement comprises a shaft aligned with a rotational axis and at least a portion of the at least one agitation surface extends around the shaft, wherein the third agitator extends away from the shaft in a direction that is orthogonal to the rotational axis.

21. A method for receiving and conveying bulk material, comprising:
   receiving bulk material in a hopper;
   agitating the bulk material in the hopper in order to counteract cohesion of the bulk material;
   assigning a priority label to each of a plurality of outlets;
   urging the bulk material in the hopper towards the plurality of outlets based on the priority label; and
   controlling valves to allow or restrict conveyance of the bulk material via the plurality of outlets.

22. The method of claim 21, wherein urging bulk material in the hopper towards the plurality of outlets comprises urging bulk material in a first direction towards the plurality of outlets and urging bulk material in a second direction towards the plurality of outlets, the second direction being opposite to the first direction.

23. An apparatus for receiving and conveying bulk material, comprising:
   a hopper for receiving bulk material;
   at least one outlet configured to enable bulk material, received by the hopper, to exit the hopper;
   a shaft;
   a motor configured to rotate the shaft;
   a first ribbon screw attached to the shaft and configured to extend helically around the shaft, wherein the first ribbon screw is configured to agitate and urge the bulk material in the hopper in a first direction towards the at least one outlet;
   a second ribbon screw attached to the shaft and configured to extend helically around the shaft, wherein the second ribbon screw is configured to agitate and urge the bulk material in the hopper in a second direction towards the at least one outlet; and
   a third ribbon screw attached to the shaft and configured to agitate the bulk material in the hopper, the third ribbon screw being positioned between the first ribbon screw and the second ribbon screw in a first dimension,
   wherein the first direction and second direction are aligned with the first dimension.

\* \* \* \* \*